US012577336B2

(12) United States Patent
Jeong et al.

(10) Patent No.: US 12,577,336 B2
(45) Date of Patent: Mar. 17, 2026

(54) POLYETHYLENE AND METHOD FOR PREPARING THE SAME

(71) Applicant: LG CHEM, LTD., Seoul (KR)

(72) Inventors: Hyun Mook Jeong, Daejeon (KR); Hee Su Oh, Daejeon (KR); Jiwon Yoon, Daejeon (KR); Yi Young Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 543 days.

(21) Appl. No.: 18/016,809

(22) PCT Filed: Sep. 29, 2021

(86) PCT No.: PCT/KR2021/013301
§ 371 (c)(1),
(2) Date: Jan. 18, 2023

(87) PCT Pub. No.: WO2022/071738
PCT Pub. Date: Apr. 7, 2022

(65) Prior Publication Data

US 2023/0287160 A1 Sep. 14, 2023

(30) Foreign Application Priority Data

Sep. 29, 2020 (KR) ........................ 10-2020-0127382
Sep. 28, 2021 (KR) ........................ 10-2021-0128249

(51) Int. Cl.
*C08F 210/16* (2006.01)

(52) U.S. Cl.
CPC ........ *C08F 210/16* (2013.01); *C08F 2500/12* (2013.01); *C08F 2500/18* (2013.01)

(58) Field of Classification Search
CPC ............... C08F 210/16; C08F 2500/12; C08F 2500/18; C08F 2420/07
See application file for complete search history.

(56) References Cited

U.S. PATENT DOCUMENTS

| | | | |
|---|---|---|---|
| 2010/0121006 | A1 | 5/2010 | Cho et al. |
| 2011/0250374 | A1 | 10/2011 | Voigt et al. |
| 2015/0266985 | A1 | 9/2015 | Uhm et al. |
| 2016/0122448 | A1 | 5/2016 | Buryak et al. |
| 2016/0159943 | A1 | 6/2016 | Greco |
| 2016/0280822 | A1 | 9/2016 | Kim et al. |
| 2017/0233511 | A1 | 8/2017 | Sun et al. |
| 2017/0260304 | A1 | 9/2017 | Al-Shammari et al. |
| 2020/0048381 | A1 | 2/2020 | Sun et al. |
| 2020/0132661 | A1 | 4/2020 | Hong et al. |
| 2021/0032449 | A1 | 2/2021 | Park et al. |
| 2021/0147660 | A1 | 5/2021 | Tran et al. |
| 2021/0230323 | A1 | 7/2021 | Lee et al. |
| 2021/0230324 | A1 | 7/2021 | Park et al. |
| 2022/0010110 | A1 | 1/2022 | Cho et al. |

FOREIGN PATENT DOCUMENTS

| | | | | | |
|---|---|---|---|---|---|
| CN | 101679540 | A | | 3/2010 | |
| CN | 104797608 | A | | 7/2015 | |
| CN | 105017456 | A | | 11/2015 | |
| CN | 105745234 | A | | 7/2016 | |
| CN | 105814101 | A | | 7/2016 | |
| CN | 106232639 | A | | 12/2016 | |
| CN | 106661160 | A | | 5/2017 | |
| CN | 106715450 | A | | 5/2017 | |
| CN | 108884193 | A | | 11/2018 | |
| CN | 110869399 | A | | 3/2020 | |
| EP | 2017302 | A1 | | 1/2009 | |
| EP | 3415540 | A1 | | 12/2018 | |
| EP | 3909988 | A1 | | 11/2021 | |
| EP | 4043519 | A1 | | 8/2022 | |
| JP | 2006-206500 | A | | 8/2006 | |
| KR | 10-1996-0011549 | B1 | | 8/1996 | |
| KR | 10-2011-0091033 | A | | 8/2011 | |
| KR | 10-1310592 | B1 | | 9/2013 | |
| KR | 10-2016-0027137 | A | | 3/2016 | |
| KR | 10-2016-0038589 | A | | 4/2016 | |
| KR | 10-2016-0067509 | A | | 6/2016 | |
| KR | 10-2018-0067944 | A | | 6/2018 | |
| KR | 20180067944 | A | * | 6/2018 | .......... C08F 4/65922 |
| KR | 10-2019-0074963 | A | | 6/2019 | |
| KR | 10-2020-0026125 | A | | 3/2020 | |
| KR | 10-2090811 | B1 | | 3/2020 | |
| KR | 10-2095523 | B1 | | 3/2020 | |
| KR | 10-2020-0071034 | A | | 6/2020 | |
| KR | 10-2020-0101873 | A | | 8/2020 | |
| WO | 2014/077617 | A1 | | 5/2014 | |
| WO | 2019/229209 | A1 | | 12/2019 | |

(Continued)

OTHER PUBLICATIONS

Machine translation into English of KR-20180067944-A (Year: 2018).*
Office Action dated Apr. 10, 2025, issued in corresponding Korean Patent Application No. 10-2020-0127384.
LG Chem, "LuceneTM SM100S", 2017, XP 093102974, 1-26 pages.
Extended European Search Report issued Nov. 29, 2023 for corresponding European Patent Application No. 21876013.0.
Office Action issued Oct. 8, 2023 for corresponding Chinese Patent Application No. 202180058167.1.

(Continued)

*Primary Examiner* — Karuna P Reddy
(74) *Attorney, Agent, or Firm* — Morgan, Lewis & Bockius LLP

(57) ABSTRACT

This invention relates to polyethylene and a method for preparing the same. More specifically, this invention relates to polyethylene that has low melt index, narrow molecular weight distribution, and a high content of high molecular weight components, and thus, exhibits excellent ESCR and tensile strength, and a method for preparing the same.

8 Claims, 1 Drawing Sheet

(56) References Cited

FOREIGN PATENT DOCUMENTS

| | | | |
|---|---|---|---|
| WO | 2020/171623 | A1 | 8/2020 |
| WO | 2020/171624 | A1 | 8/2020 |

OTHER PUBLICATIONS

International Search Report (with translation) and Written Opinion dated Jan. 10, 2022, issued in corresponding International Patent Application No. PCT/KR2021/013301.
Bourissou, et al., "The role of boron and phosphorus in Cp-based catalysts for olefin polymerization," Comptes Rendus Chimie, vol. 9, 2006, pp. 1120-1142.
Kohrt et al., "Borata-Alkene Derived Syntheses of (F5C6)2B-Substituted Bis(indenyl) Group 4 Metal Complexes," Organometallics, vol. 35, 2016, pp. 2689-2693.
Office Action dated Dec. 11, 2024, issued in corresponding Korean Patent Application No. 10-2020-0125239.

* cited by examiner

POLYETHYLENE AND METHOD FOR PREPARING THE SAME

CROSS-REFERENCE TO RELATED APPLICATION(S)

This application claims the benefit of Korean Patent Application No. 10-2020-0127382 filed on Sep. 29, 2020 and Korean Patent Application No. 10-2021-0128249 filed on Sep. 28, 2021 with the Korean Intellectual Property Office, the disclosures of which are herein incorporated by reference in their entirety.

BACKGROUND OF THE INVENTION

(a) Field of the Invention

This invention relates to polyethylene and a method for preparing the same. More specifically, this invention relates to polyethylene that has low melt index, narrow molecular weight distribution, and a high content of high molecular weight components, and thus, exhibits excellent ESCR and tensile strength, and a method for preparing the same.

(b) Description of the Related Art

Olefin polymerization catalyst system is classified into Zeigler-Natta and metallocene catalyst systems, and these high activity catalyst systems have been developed according to each characteristic. Although a Zeigler-Natta catalyst has been widely applied for the existing commercial processes since it was invented in 1950's, because it is a multi site catalyst having a plurality of active sites, the molecular weight distribution of the prepared polymer is wide, and the composition distribution of comonomers is not uniform, and thus, it has a limitation in securing desired properties.

Meanwhile, a metallocene catalyst consists of a main catalyst including a transition metal compound as a main component and a cocatalyst of an organometal compound including aluminum as a main component, and such a catalyst is a homogeneous complex catalyst and a single site catalyst, and thus, a polymer having narrow molecular weight distribution and uniform composition distribution of comonomers is obtained due to the properties of a single site.

However, polymer polymerized using a metallocene catalyst has narrow molecular weight distribution, and thus, if applied for some products, productivity may be deteriorated due to the influence of extrusion load, and the like.

Meanwhile, resin used for food containers, and the like is required to have excellent processability, mechanical properties and environmental stress crack resistance. Thus, there is a continued demand for technology relating to preparation of polyolefin that satisfies high molecular weight, broader molecular weight distribution and preferable comonomer distribution, and the like, and thus, can be preferably used as a container or a bottle cap.

Particularly, a bottle cap for carbonated drink continuously receives surface stress due to carbon dioxide gas existing in an amount of 4.2 vol % or more in carbonated drink. Thus, it should have very excellent tensile strength so that deformation of a cap may not occur, and should have excellent resistance to carbon dioxide gas of the bottle cap surface, namely cap crack resistance.

And, crack or residual stress is often generated on the surface of a bottle cap according to injection environment, and in this case, tension is continuously applied by high pressure, and thus, crack is spread and grows along the bottle cap surface, thus destructing the bottle cap. Thus, in order to prevent deformation and destruction of a bottle cap, ESCR (Environmental stress crack resistance) of the resin for preparing the same should also be excellent.

As such, in order to prepare resin having excellent tensile strength and ESCR, it is required to have narrow molecular weight distribution, low melt flow rate, low melt flow rate ratio, and a high content of high molecular weight components.

Under these circumstances, there is an increasing demand for the development of polyethylene with balanced properties and processability so as to secure excellent ESCR and tensile strength when preparing polyethylene.

SUMMARY OF THE INVENTION

It is an object of the invention to provide polyethylene that has low melt index, narrow molecular weight distribution, and a high content of high molecular weight components, and thus, exhibits excellent ESCR and tensile strength, and a method for preparing the same.

According to one embodiment of the invention, there is provided polyethylene satisfying the following requirements of i) to v):

i) density measured at 23° C. according to ISO 1183-2 being 0.945 to 0.960 g/$cm^3$;

ii) melt flow rate (MFR) measured at 190° C. under load of 2.16 kg according to ASTM D1238 being 0.4 to 2.0 g/10 min;

iii) melt flow rate ratio (MFRR, $MFR_5/MFR_{2.16}$) measured at 190° C. according to ASTM D1238 being 3.0 to 5.0;

iv) molecular weight distribution (MWD, Mw/Mn) being 7.0 to 15.0; and v) an integral value of the area where Log Mw value is 6.0 or more in a GPC curve graph being 2.0 to 7.0% of the entire integral value.

There is also provided a method for preparing the polyethylene.

The polyethylene according to the invention has low melt index, narrow molecular weight distribution, and a high content of high molecular weight components, thus enabling preparation of articles having excellent ESCR and tensile strength, and thus, can be usefully applied for the preparation of beverage containers or bottle caps requiring such properties.

DETAILED DESCRIPTION OF THE EMBODIMENTS

Figure 1:
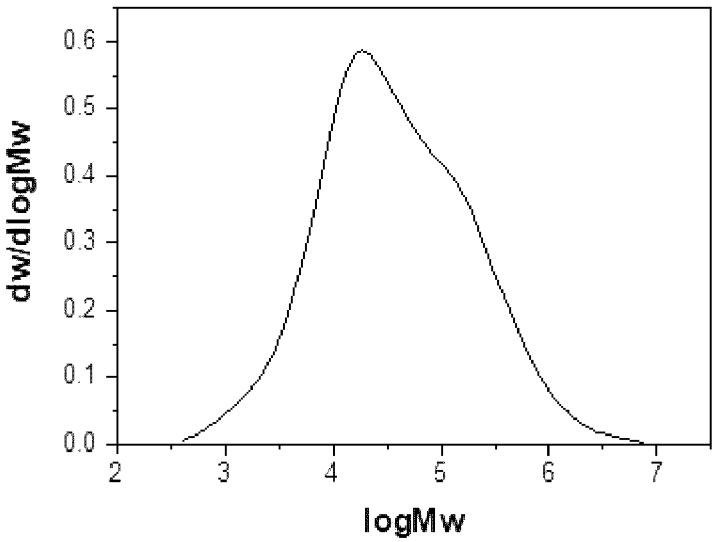
FIG. 1 is a GPC graph of polyethylene according to Example 1 of the invention.

As used herein, terms "a first", "a second" and the like are used to explain various constructional elements, and they are used only to distinguish one constructional element from other constructional elements.

And, the terms used herein are only to explain specific embodiments, and are not intended to limit the invention. A singular expression includes a plural expression thereof, unless it is expressly stated or obvious from the context that such is not intended. As used herein, the terms "comprise", "equipped" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, the invention will be explained in detail.

According to one embodiment of the invention, there is provided polyethylene satisfying the following requirements of i) to v):

i) density measured at 23° C. according to ISO 1183-2 being 0.945 to 0.960 g/cm$^3$;

ii) melt flow rate (MFR) measured at 190° C. under load of 2.16 kg according to ASTM D1238 being 0.4 to 2.0 g/10 min;

iii) melt flow rate ratio (MFRR, $MFR_5/MFR_{2.16}$) measured at 190° C. according to ASTM D1238 being 3.0 to 5.0;

iv) molecular weight distribution (MWD, Mw/Mn) being 7.0 to 15.0; and v) an integral value of the area where Log Mw value is 6.0 or more in a GPC curve graph being 2.0 to 7.0% of the entire integral value.

i) Density

The polyethylene according to one embodiment of the invention may be high density polyethylene (HDPE) satisfying density measured at 23° C. according to ISO 1183-2, of 0.945 g/cm$^3$ to 0.960 g/cm$^3$.

More specifically, the density of the polyethylene according to one embodiment of the invention may be 0.945 g/cm$^3$ or more, or 0.949 g/cm$^3$ or more, or 0.950 g/cm$^3$ or more and 0.960 g/cm$^3$ or less, or 0.958 g/cm$^3$ or less, or 0.956 g/cm$^3$ or less, or 0.955 g/cm$^3$ or less, or 0.952 g/cm$^3$ or less.

ii) Melt Flow Rate ($MFR_{2.16}$)

The polyethylene according to one embodiment of the invention may have melt flow rate (MFR) measured at 190° C. under load of 2.16 kg according to ASTM D1238, of 0.4 to 2.0 g/10 min.

More specifically, melt flow rate (MFR) of the polyethylene according to one embodiment of the invention may be 0.4 g/10 min or more, or 0.45 g/10 min or more, or 0.5 g/10 min or more, or 0.6 g/10 min or more and 2.0 g/10 min or less, or 1.9 g/10 min or less, or 1.8 g/10 min or less, or 1.7 g/10 min or less, or 1.6 g/10 min or less, or 1.5 g/10 min or less, or 1.4 g/10 min or less, or 1.3 g/10 min or less, or 1.2 g/10 min or less, or 1.1 g/10 min or less, or 1.0 g/10 min or less, or 0.9 g/10 min or less, or 0.8 g/10 min or less.

It means that the polyethylene has high weight average molecular weight, and a high content of high molecular weight components, and thereby, it may exhibit excellent mechanical properties such as high tensile strength.

If the melt flow rate ($MFR_{2.16}$) is less than 0.4 g/10 min, flowability may be poor, and thus, during injection molding of a cap, deviation may increase or injection pressure may increase, and if it is greater than 2.0 g/10 min, crack resistance may decrease.

Since the polyethylene of the invention has low melt flow rate as described above, it may satisfy excellent injection moldability and cap crack resistance, when manufacturing a cap.

iii) Melt Flow Rate Ratio (MFRR, $MFR_5/MFR_{2.16}$)

The polyethylene according to one embodiment of the invention may have melt flow rate ratio (MFRR, $MFR_5/MFR_{2.16}$) measured at 190° C. according to ASTM D1238, of 3.0 to 5.0.

The MFRR is a value obtained by dividing melt flow rate ($MFR_5$) measured at 190° C. under load of 5 kg by melt flow rate ($MFR_{2.16}$) measured at 190° C. under load of 2.16 kg for the polyethylene.

More specifically, melt flow rate ratio (MFRR, $MFR_5/MFR_{2.16}$) measured at 190° C. according to ASTM D1238 of the polyethylene according to one embodiment of the invention may be 3.0 or more, or 3.1 or more, or 3.2 or more, or 3.3 or more and 5.0 or less, or 4.5 or less, or 4.0 or less, or 3.8 or less.

If melt flow rate ratio is less than 3.0, crack resistance may decrease, and if it is greater than 5.0, due to large content of ultra high molecular weight components, resin flowability may be poor during injection molding.

Since the polyethylene of the invention has narrow melt flow rate ratio as described above, it may satisfy excellent ESCR and cap crack resistance.

iv) Molecular Weight Distribution (MWD, Mw/Mn)

The polyethylene according to one embodiment of the invention may have molecular weight distribution (MWD, Mw/Mn) of 7.0 to 15.0.

More specifically, the molecular weight distribution of the polyethylene according to one embodiment of the invention may be 7.0 or more, or 7.2 or more, or 7.5 or more, or 8.0 or more, or 9.0 or more, or 10.0 or more, or 11.0 or more and 15.0 or less, or 14.7 or less, or 14.5 or less, or 14.0 or less, or 13.5 or less, or 13.0 or less, or 12.5 or less, or 12.0 or less.

As described above, since the polyethylene of the invention has relatively narrow molecular weight distribution compared to low melt flow rate, it may simultaneously satisfy excellent mechanical properties and tensile strength.

In the present disclosure, the weight average molecular weight (Mw) and number average molecular weight (Mn) of polyethylene are respectively measured using gel permeation chromatography (GPC), and the ratio of the weight average molecular weight to the number average molecular weight (Mw/Mn) is calculated as the molecular weight distribution (Mw/Mn) of polyethylene.

Specifically, a polyethylene sample was evaluated using Waters PL-GPC220 device, using Polymer Laboratories PLgel MIX-B 300 mm length column. Wherein, the measurement temperature was 160° C., 1,2,4-trichlorobenzene was used as a solvent, and the flow rate was 1 mL/min. A sample was prepared at the concentration of 10 mg/10 mL, and fed in an amount of 200 μL. Using a calibration curve formed using a polystyrene standard specimen, Mw and Mn were measured. Wherein, as the polystyrene standard specimen, 9 kinds having weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol were used.

v) Integral Value of the Area where Log Mw Value is 6.0 or More in a GPC Curve Graph The polyethylene according to one embodiment of the invention may have an integral value of the area where Log Mw value is 6.0 or more in a GPC curve graph, being 2.0 to 7.0% of the entire integral value. The GPC curve graph shows logarithmic function molecular weight and mass fraction of polyethylene measured by GPC, in x axis and y axis. Wherein, the Mw means weight-average molecular weight.

More specifically, the integral value of the area where Log Mw value is 6.0 or more of the polyethylene according to one embodiment of the invention may be 2.0% or more, or 2.1% or more, or 2.2% or more, or 2.3% or more, or 2.4% or more or 2.5% or more and 7.0% or less, or 6.5% or less, or 6% or less, or 5.5% or less, or 5.0% or less, or 4.5% or less, or 4.0% or less of the entire integral value.

As such, the integral value of the area where Log Mw value is 6.0 or more being 2.0 to 7.0% means that the polyethylene of the invention has a high content of high molecular weight components. Thereby, ESCR and cap crack resistance, which are proportional to the high molecular weight content in polyethylene resin, may be improved.

vi) Other Properties

The polyethylene according to one embodiment of the invention may have an integral value of the area where Log Mw is 3.0 or less, being 2.5% or less of the entire integral value, in a GPC curve graph where the x axis is log Mw, and the y axis is dw/d log Mw. The GPC curve graph shows logarithmic function molecular weight and mass fraction of polyethylene measured by GPC, in the x axis and y axis. Wherein, the Mw means weight-average molecular weight.

More specifically, the integral value of the area where Log Mw value is 3.0 or less of the polyethylene according to one embodiment of the invention may be 0.1% or more, or 0.2% or more, or 0.3% or more and 2.5% or less, or 2.2% or less, or 2.0% or less, or 1.8% or less, or 1.6% or less, or 1.5% or less, or 1.4% or less of the entire integral value.

As such, the integral value of the area where Log Mw value is 3.0 or less being 2.5% or less means that the polyethylene of the invention has a low content of low molecular weight components. Thereby, ESCR and cap crack resistance, which are inversely proportional to the low molecular weight content in polyethylene resin, may be improved.

The polyethylene according to one embodiment of the invention may be copolymer of ethylene; and one or more comonomers selected from the group consisting of propylene, 1-butene, 1-hexene, 4-methyl-1-pentene and 1-octene. More specifically, the polyethylene according to one embodiment of the invention may be copolymer of ethylene and 1-butene.

The polyethylene of the invention satisfying the above properties may not only has low melt flow rate and melt flow rate ratio, narrow molecular weight distribution, but also has a high content of high molecular weight components, and thus, can be very preferably used as food containers, particularly bottle caps of carbonated drink, requiring stability under high pressure environment.

The polyethylene of the invention has environmental stress crack resistance (ESCR) measured according to ASTM D 1693, of 200 hours or more, or 230 hours or more, or 250 hours or more. If the environmental stress crack resistance is 200 hours or more, it can stably maintain performance while being used as a bottle cap, and thus, the upper limit is substantially meaningless, but may be 1,000 hours or less, or 800 hours or less, or about 500 hours or less. As such, the polyethylene of the invention exhibits high environmental stress crack resistance, and thus, when molded as a food container such as a bottle cap and used under high pressure condition, it has high stability and can maintain continuous performance.

And, cap crack resistance of the polyethylene of the invention may be 120 hours or more, or 130 hours or more, or 140 hours or more, or 150 hours or more and 500 hours or less, or 400 hours or less, or about 300 hours or less, or about 250 hours or less, wherein the cap crack resistance is measured as a time when a water pressure begins to decrease, after applying a water pressure of 5 bar inside a Cap (28 mm cap according to PET standard PCO 1881) prepared by injection molding of the polyethylene of the invention, while the cap is dipped in a Igepal 5% solution bath.

Cap crack resistance effectively evaluates crack resistance withstanding high pressure of 5 bar or more by carbon dioxide, when used as a bottle cap for carbonate drink. When a stopper or cap is prepared using the polyethylene of the invention, and combined with a PET bottle containing a content such as carbonated drink, and then, cap crack resistance of the cap against carbonic acid continuously generated from the content during distribution and storage is measured, the cap crack resistance is 120 hours or more, thus exhibiting very excellent property.

As such, the polyethylene of the invention exhibits high environmental stress crack resistance and cap crack resistance, and thus, when molded into a food container such as bottle cap and stored under high temperature or high humidity environment, it can withstand high pressure by the content and has high stability, and thus, can maintain continuous performance.

And, the polyethylene of the invention may exhibit high tensile strength of 35 MPa or more, or 36 MPa or more, or 37 MPa or more, measured according to ASTM D638. It is more preferable that the upper limit is higher, but the upper limit may be substantially 50 MPa or less, or 45 MPa or less, or 40 MPa or less. As such, the polyethylene of the invention exhibits high tensile strength, and thus, when molded into a food container such as a bottle cap and used under high pressure condition, it has high stability and can maintain continuous performance.

Preferably, the polyethylene of the invention satisfies environmental stress crack resistance (ESCR), cap crack resistance, and tensile strength of the above ranges, thereby exhibiting excellent processability, mechanical properties and stability appropriate for the manufacture of a food container such as a bottle cap.

The polyethylene according to the invention may be prepared by polymerizing olefinic monomers in the presence of a hybrid supported catalyst comprising a first transition metal compound represented by the following Chemical Formula 1; a second transition metal compound represented by the following Chemical Formula 2; and a carrier where the first and second transition metal compounds are supported:

[Chemical Formula 1]

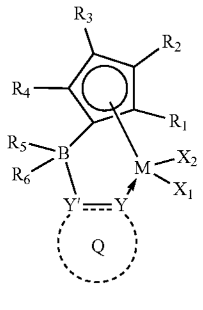

in the Chemical Formula 1,

B is boron,

M is Group 4 transition metal, $R_1$ to $R_4$ are each independently, hydrogen, $C_{1-20}$ alkyl, $C_{3-20}$ cycloalkyl, or $C_{6-20}$ aryl, or $R_1$ and $R_2$ or $R_3$ and $R_4$ are bonded with each other to form a substituted or unsubstituted $C_{6-60}$ aromatic ring, $R_5$ and $R_6$ are each independently, $C_{1-20}$ alkyl, $C_{3-20}$ cycloalkyl, or $C_{6-20}$ aryl, or $R_5$ and $R_6$ are bonded with each other to form a $C_{3-60}$ aliphatic ring, or a $C_{6-60}$ aromatic ring, $X_1$ and $X_2$ are each independently, $C_{1-20}$ alkyl or —O(CO)R', wherein R' is $C_{1-20}$ alkyl, Q is a substituted or unsubstituted $C_{2-60}$ heterocycle comprising one or more selected from the group consisting of N, O and S, Y and Y' are elements constituting Q, Y is N, O, or S, Y' is an element of Q adjacent to Y, and N or C, $$[Cp_1(R_7)_a][Cp_2(R_8)_b]M'X_3X_4 \qquad \text{[Chemical Formula 2]}$$

in the Chemical Formula 2, $Cp_1$ and $Cp_2$ are identical to or different from each other, are each independently, one of cyclopentadienyl, indenyl, 4,5,6,7-tetrahydro-1-indenyl and fluorenyl groups, M' is Group 4 transition metal, $X_3$ and $X_4$ are each independently, halogen, $C_{1-20}$ alkyl, $C_{2-10}$ alkenyl, $C_{6-20}$ aryl, $C_{7-20}$ alkylaryl, or $C_{7-20}$ arylalkyl, $R_7$ and $R_8$ are identical to or different from each other, are each independently, one of hydrogen, a C1 to 30 hydrocarbyl group, a C1 to 30 hydrocarbyloxy group, a C2 to 30 hydrocarbyloxyhydrocarbyl group, —$SiH_3$, a C1 to 30 hydrocarbyl(oxy)silyl group, and a C1 to 30 hydrocarbyl group substituted with halogen, and a and b are each independently, an integer of 0 to 5.

Unless otherwise defined, the following terms may be defined as follows.

The halogen may be fluoro (F), chloro (Cl), bromo (Br) or iodo (I).

The alkyl may be linear, or branched alkyl. Specifically, the $C_{1-20}$ alkyl may be $C_{1-20}$ linear alkyl; $C_{1-10}$ linear alkyl; $C_{1-5}$ linear alkyl; $C_{3-20}$ branched alkyl; $C_{3-15}$ branched alkyl; or $C_{3-10}$ branched alkyl. More specifically, the $C_{1-20}$ alkyl may be methyl, ethyl, n-propyl, iso-propyl, n-butyl, iso-butyl, tert-butyl, n-pentyl, or iso-pentyl, and the like, but is not limited thereto. Meanwhile, throughout the specification, "iPr" means an iso-propyl group.

The cycloalkyl may be cyclic alkyl. Specifically, the $C_{3-20}$ cycloalkyl may be $C_{3-20}$ cyclic alkyl; $C_{3-15}$ cyclic alkyl; or $C_{3-10}$ cyclic alkyl. More specifically, cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, and the like may be mentioned, but not limited thereto. Meanwhile, throughout the specification, "Cy" means C3 to 6 cycloalkyl.

The alkenyl may be linear, branched or cyclic alkenyl. Specifically, the $C_{2-20}$ alkenyl may be $C_{2-20}$ linear alkenyl, $C_{2-10}$ linear alkenyl, $C_{2-5}$ linear alkenyl, $C_{3-20}$ branched alkenyl, $C_{3-15}$ branched alkenyl, $C_{3-10}$ branched alkenyl, $C_{5-20}$ cyclic alkenyl or $C_{5-10}$ cyclic alkenyl. More specifically, $C_{2-20}$ alkenyl may be ethenyl, propenyl, butenyl, pentenyl or cyclohexenyl, and the like.

The alkoxy may be a linear, branched or cyclic alkoxy group. Specifically, the $C_{1-20}$ alkoxy may be $C_{1-20}$ linear alkoxy; $C_{1-10}$ linear alkoxy; $C_{1-5}$ linear alkoxy; $C_{3-20}$ branched or cyclic alkoxy; $C_{3-15}$ branched or cyclic alkoxy; or $C_{3-10}$ branched or cyclic alkoxy. More specifically, $C_{1-20}$ alkoxy may be methoxy, ethoxy, n-propoxy, iso-propoxy, n-butoxy, iso-butoxy, tert-butoxy, n-pentoxy, iso-pentoxy, neo-pentoxy or cyclohextoxy, but is not limited thereto.

The alkoxyalkyl is a structure comprising —Ra—O—Rb, wherein one or more hydrogen atoms of the alkyl (—Ra) may be substituted with alkoxy (—O—Rb). Specifically, the $C_{2-20}$ alkoxyalkyl may be methoxymethyl, methoxyethyl, ethoxymethyl, iso-propoxymethyl, iso-propoxyethyl, iso-propoxyhexyl, tert-butoxymethyl, tert-butoxyethyl or tert-butoxyhexyl, and the like, but is not limited thereto.

The aryl includes monocyclic, bicyclic or tricyclic aromatic hydrocarbon. According to one example of the invention, the aryl group may have a carbon number of 6 to 60 or 6 to 20, and specifically, phenyl, naphthyl, anthracenyl, dimethylanilinyl, anisolyl, and the like, but is not limited thereto.

The heteroaryl is heteroaryl comprising one or more selected from O, N, and S as heteroatom, and the carbon number is not specifically limited, but it may have a carbon number of 2 to 60 or 2 to 20. As examples of the heteroaryl, xanthene, thioxanthen, thiophene, furan, pyrrole, imidazole, thiazole, oxazole, oxadiazole, triazole, pyridyl, bipyridyl, pyridinyl, pyrimidyl, triazine, acridyl, pyridazine, pyrazinyl, quinolinyl, quinazoline, quinoxalinyl, phthalazinyl, pyrido pyrimidinyl, pyrido pyrazinyl, pyrazino pyrazinyl, isoquinoline, indole, carbozole, benzoxazole, benzoimidazole, benzothiazole, benzocarbazole, benzothiophene, dibenzothiophene, benzofuranyl, phenanthroline, isoxazolyl, thiadiazolyl, phenothiazinyl and dibenzofuranyl, and the like may be mentioned, but is not limited thereto.

The hydrocarbyl group means a monovalent hydrocarbon compound, and includes alkyl, alkenyl, alkynyl, aryl, aralkyl, aralkenyl, aralkynyl, alkylaryl, alkenylaryl and alkynylaryl, and the like. For example, the hydrocarbyl group may be linear, branched or cyclic alkyl. More specifically, a C1 to 30 hydrocarbyl group may be a linear, branched or cyclic alkyl group, such as methyl, ethyl, n-propyl, iso-propyl, n-butyl, iso-butyl, tert-butyl, n-pentyl, n-hexyl, n-heptyl, cyclohexyl, and the like; or an aryl group, such as phenyl, biphenyl, naphthyl, anthracenyl, phenanthrenyl, or fluorenyl, and the like. And, it may be alkylaryl such as methylphenyl, ethylphenyl, methylbiphenyl, methylnaphthyl, and the like, or arylalkyl such as phenylmethyl, phenylethyl, biphenylmethyl, naphthylmethyl, and the like. And, it may be alkenyl such as allyl, ethenyl, propenyl, butenyl, pentenyl, and the like.

The heterocycle includes both an aliphatic ring comprising one or more selected from N, O and S, and aromatic ring comprising one or more selected from N, O and S.

And, the Group 4 transition metal may be titanium (Ti), zirconium (Zr), hafnium (Hf), or rutherfordium (Rf), and specifically, it may be titanium (Ti), zirconium (Zr), or hafnium (Hf), more specifically, zirconium (Zr) or hafnium (Hf), but is not limited thereto.

The above explained substituents may be optionally substituted with one or more substituents selected from the group consisting of hydroxy; halogen; alkyl or alkenyl, aryl, alkoxy; alkyl or alkenyl, aryl, alkoxy comprising one or more heteroatoms among Group 14 to Group 16 heteroatoms; amino; silyl; alkylsilyl or alkoxysilyl; phosphine; phosphide; sulfonate; and sulfone, within a range where the effects equivalent or similar to the aimed effects are exhibited.

The first transition metal compound represented by the Chemical Formula 1 adopts a bridge structure comprising a boron anion, unlike commonly used CGC type precursor. The existing CGC type precursor comprises a neutral bridge structure comprising silicon, and thus, the ligand unit is negatively charged. Thus, it has a structural limitation, and it is difficult to exhibit various properties when preparing olefin polymer.

On the other hand, the first transition metal compound of the invention has a negatively charged bridge structure, and thus, may have a neutral ligand unit. The ligand unit of the invention is heterocycle Q of the Chemical Formula 1, wherein Y, the element of Q, is coordinately bonded with metal, and Y', the element of Q adjacent to Y, is connected to the bridge. Thus, using various neutral ligand units satisfying such a structure, catalysts with higher activity and copolymerizability than the existing CGC precursors may be prepared.

And, as the metal substituent of the first transition metal compound, alkyl or carboxylate is included, which functions as a good leaving group, thereby promoting a reaction with a cocatalyst such as MAO, and increasing activity.

Preferably, M may be zirconium (Zr).

Preferably, $R_1$ to $R_4$ may be each independently, hydrogen, $C_{1-10}$ alkyl or $C_{6-20}$ aryl, or $R_1$ and $R_2$ or $R_3$ and $R_4$ may be bonded with each other to form a substituted or unsubstituted $C_{6-60}$ aromatic ring, and more preferably, $R_1$ to $R_4$ may be each independently, hydrogen, or methyl, or $R_1$ and $R_2$ or $R_3$ and $R_4$ may be bonded with each other to form a benzene ring, or a 1,2,3,4-tetrahydronaphthalene ring, wherein the benzene ring, or 1,2,3,4-tetrahydronaphthalene ring may be unsubstituted, or substituted with 1 to 4 substituents selected from the group consisting of methyl, tert-butyl and 4-tert-butyl phenyl.

Preferably, $R_5$ and $R_6$ may be each independently, $C_{1-10}$ alkyl, or $C_{6-20}$ aryl, or $R_5$ and $R_6$ are bonded with each other to form a $C_{3-60}$ aliphatic ring, or a $C_{6-60}$ aromatic ring, and more preferably, $R_5$ and $R_6$ may be each independently, methyl, or phenyl, or $R_5$ and $R_6$ are bonded with each other to form a cyclooctane ring.

Most preferably, $R_5$ and $R_6$ may be respectively phenyl.

Preferably, $X_1$ and $X_2$ may be each independently, methyl, or acetate.

Preferably, R' may be methyl.

Preferably, $X_1$ and $X_2$ may be identical to each other.

Preferably, Q may be a substituted or unsubstituted $C_{2-60}$ heterocycle comprising one or more selected from the group consisting of N, O and S, and more preferably, Q may be a pyridine ring, a quinoline ring, a 4,5-dihydrooxazole ring, a pyrazole ring, or a benzoxazole ring, and the Q may be unsubstituted, or substituted with 1 to 4 substituents selected from the group consisting of methyl, isopropyl and diphenylamino.

More preferably, Q may be a pyridine ring, a 4,5-dihydrooxazole ring, a pyrazole ring, or a benzoxazole ring, and the Q may be unsubstituted, or substituted with 1 to 4 substituents selected from the group consisting of methyl, isopropyl and diphenylamino.

Y is a hetero atom coordinately bonded with metal M, and preferably, Y may be N.

Meanwhile, as specific examples of the first transition metal compound represented by the Chemical Formula 1, compounds represented by the following structural formulas may be mentioned, but not limited thereto.

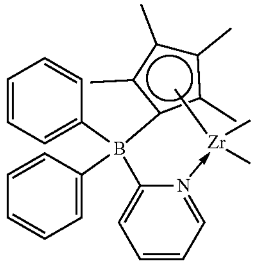

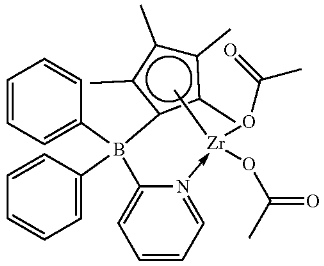

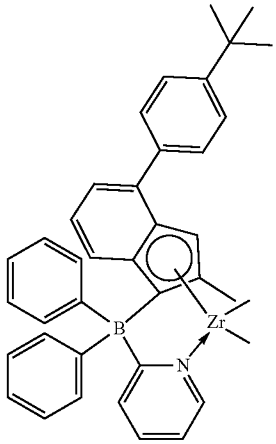

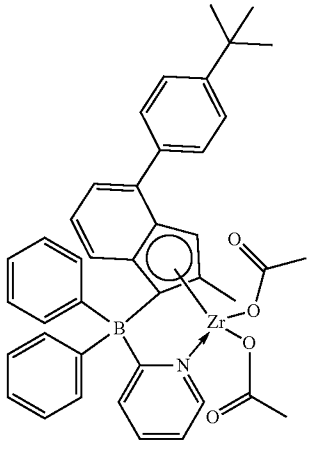

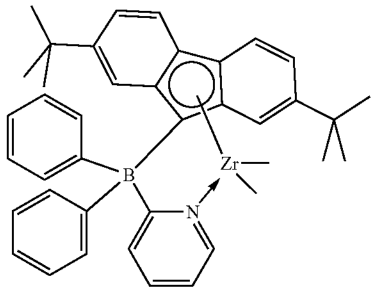

-continued
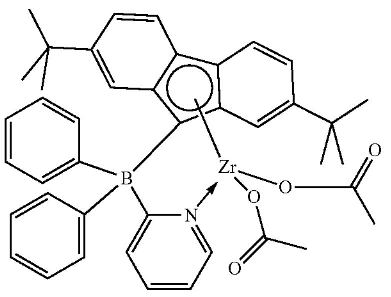
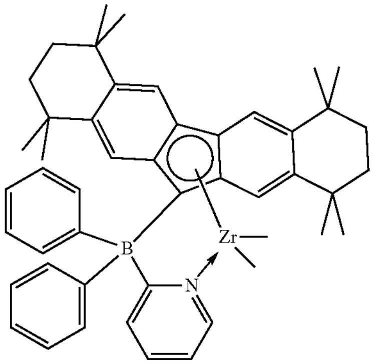
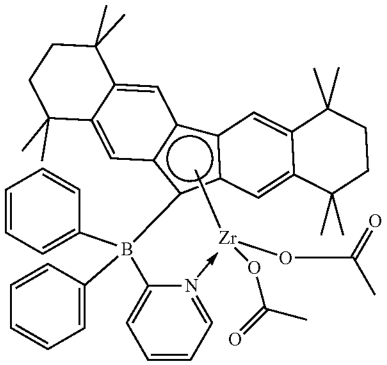
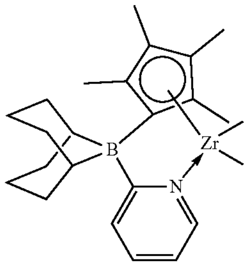
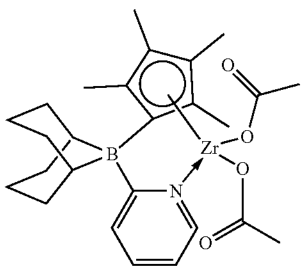
-continued
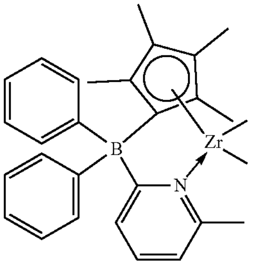
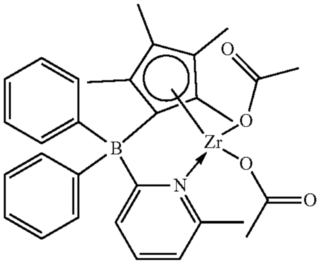
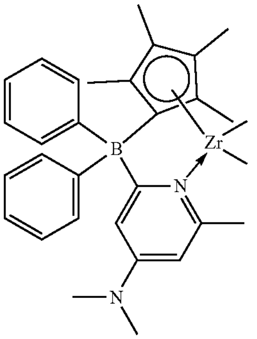
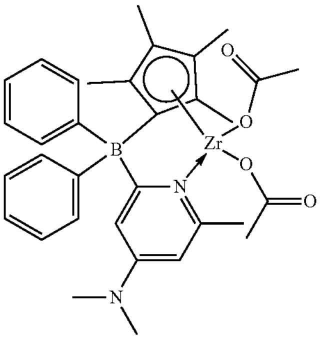
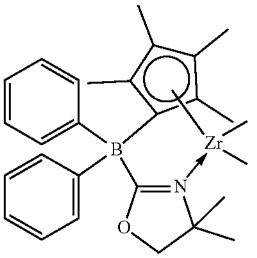
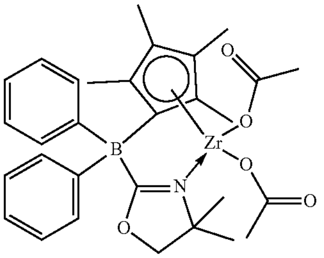

-continued
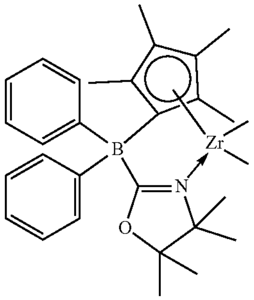
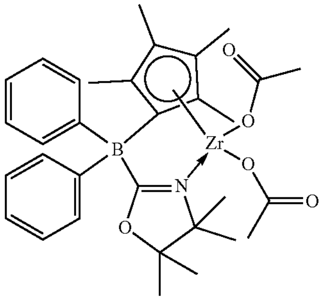
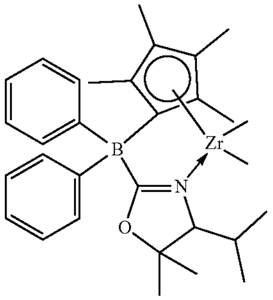
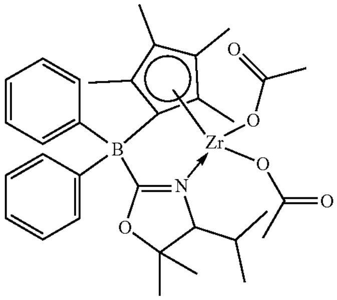
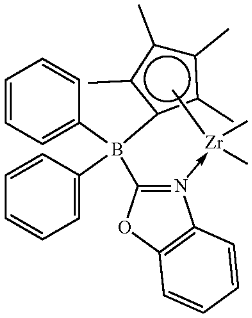
-continued
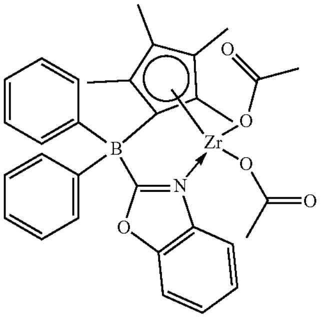
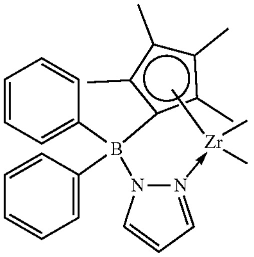
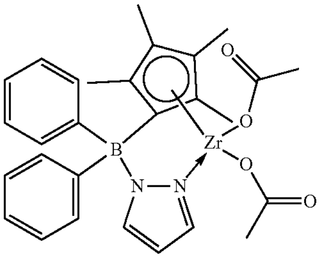
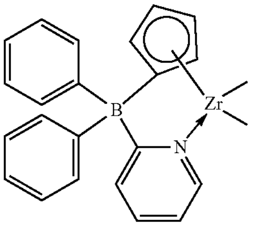
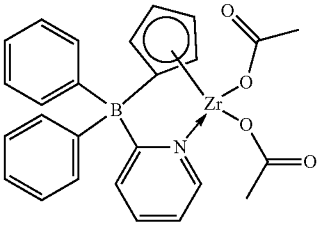
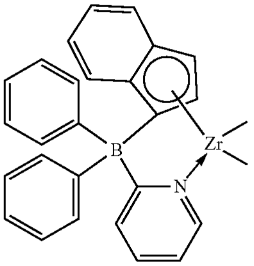

-continued

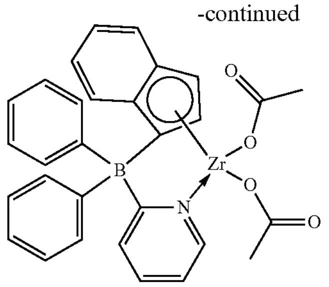

The first transition metal compound represented by the Chemical Formula 1, when $X_1$ and $X_2$ are identical, may be prepared by the preparation method as shown in the following Reaction Formula 1, but the method is not limited thereto, and it may be prepared by preparation methods of organic compounds and metallocene compounds known in the art. The preparation method will be embodied in preparation examples described later.

[Reaction Scheme 1]

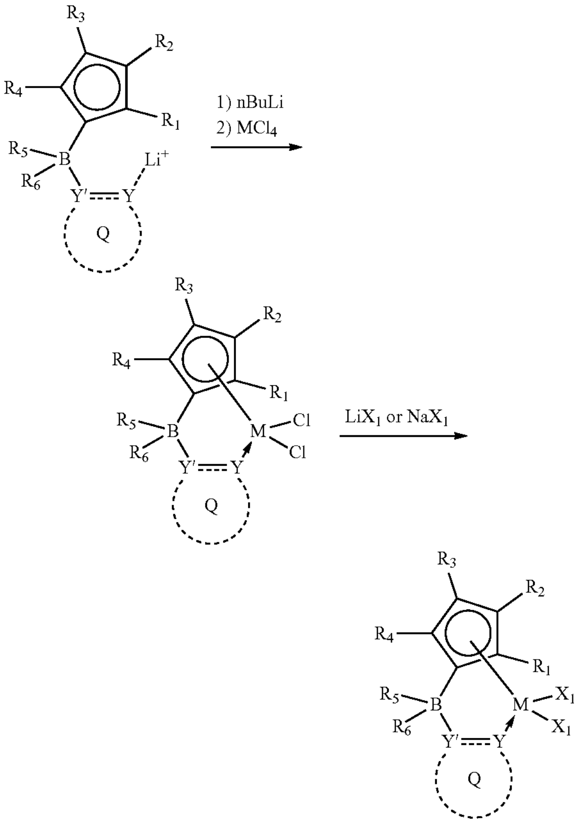

In the Reaction Formula 1, B, M, $R_1$ to $R_6$, $X_1$, $X_2$, Q, Y and Y' are as defined in the Chemical Formula 1.

Unlike the first transition metal compound, if the second transition metal compound represented by the Chemical Formula 2 is activated by appropriate methods and used as a catalyst for olefin polymerization, it can provide low molecular weight polyolefin. Thus, a hybrid supported catalyst comprising the first and second transition metal compounds can provide polyolefin with wide molecular weight distribution.

Specifically, in the Chemical Formula 2, $Cp_1$ and $Cp_2$ may be cyclopentadienyl. The second transition metal compound wherein $Cp_1$ and $Cp_2$ are cyclopentadienyl groups, and the cyclopentadienyl groups are not bridged, exhibits low copolymerizability for alpha-olefin during olefin polymerization, and dominantly produces low molecular weight polyolefin. Thus, if such a second transition metal compound is supported together in the same carrier as that of the first transition metal compound of the Chemical Formula 1, molecular weight distribution of polyolefin, distribution of monomers copolymerized in polyolefin chain, and copolymerizability of olefin may be easily controlled, and thus, the aimed properties of the polyolefin of the invention may be more easily realized.

The $Cp_1$ may be substituted with 1 to 5 $R_7$, and the $Cp_2$ may be substituted with 1 to 5 $R_8$. In the Chemical Formula 2, when a is an integer of 2 or more, the plural $R_7$'s may be identical to or different from each other. And, in the Chemical Formula 2, when b is an integer of 2 or more, the plural $R_8$'s may be identical to or different from each other.

Such $R_7$ and $R_8$ may be each independently, one of hydrogen, $C_1$ to 10 hydrocarbyl, C1 to 10 hydrocarbyloxy and C2 to 20 hydrocarbyloxyhydrocarbyl. The second transition metal compound having the above described substituents $R_7$ and $R_8$ may have excellent support stability.

And, in the Chemical Formula 2, $X_3$ and $X_4$ may be identical to or different from each other, and may be each independently, one of halogen. In the second transition metal compound having the above described $X_3$ and $X_4$, the halogen group may be easily substituted with an alkyl group, by the reaction with alkyl metal or methyl aluminoxane cocatalyst. And, by the subsequent alkyl abstraction, the second transition metal compound may form a ionic intermediate with the cocatalyst, thereby more easily providing a cationic form, which is the active species of olefin polymerization.

Preferably, M' may be zirconium (Zr).

As examples of the second transition metal compound that can be combined with the first transition metal compound to provide polyolefin having broad molecular weight distribution, the following compounds may be exemplified.

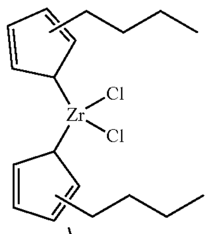
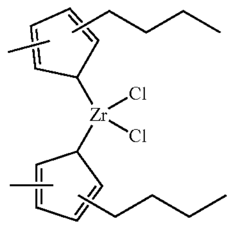
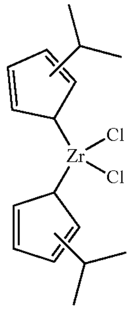
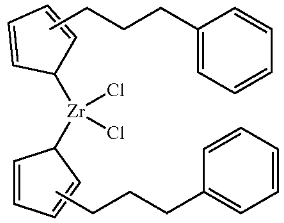

-continued

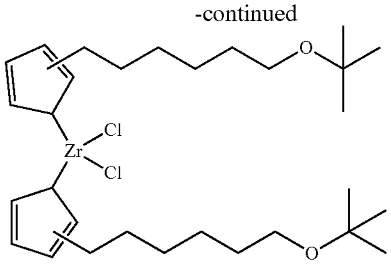

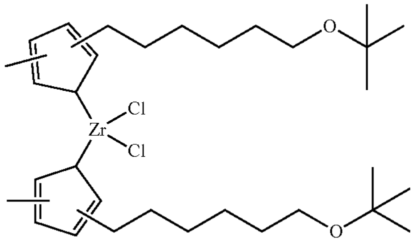

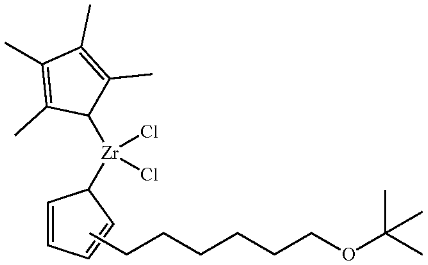

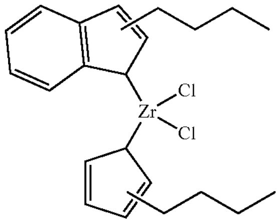

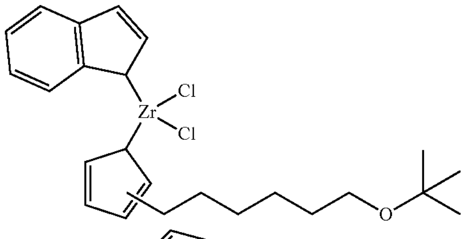

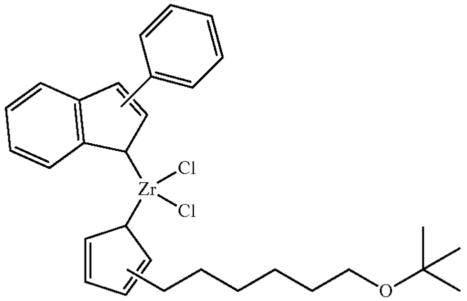

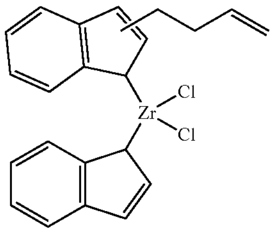

-continued

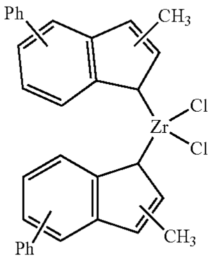

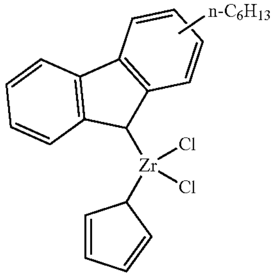

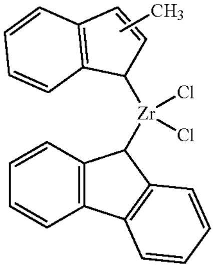

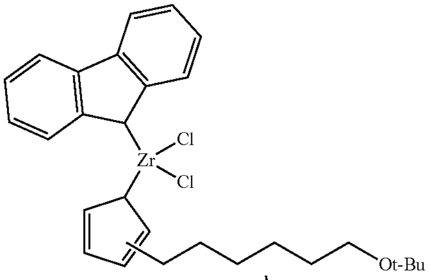

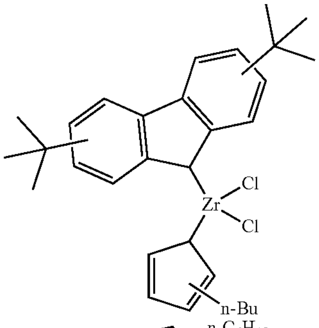

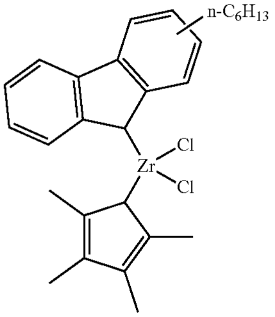

The hybrid supported catalyst may comprise a second transition metal compound wherein $Cp_1$ and $Cp_2$ are cyclopentadienyl groups.

The hybrid supported catalyst may comprise a second transition metal compound wherein $R_7$ and $R_8$ are identical to or different from each other, and are each independently, one of hydrogen, a C1 to 10 hydrocarbyl group, a C1 to 10 hydrocarbyloxy group and a C2 to 20 hydrocarbyloxyhydrocarbyl group.

The hybrid supported catalyst may comprise a second transition metal compound wherein $X_3$ and $X_4$ are identical to or different from each other, and are each independently, one of halogen.

The first and second transition metal compounds may be combined in an appropriate content according to the properties of polyolefin to be prepared. For example, in order to provide high molecular weight polyolefin having broad molecular weight distribution, the first and second transition metal compounds may be used at a mole ratio of 1:1 to 1:10. Thereby, molecular weight distribution of polyolefin, distribution of monomers copolymerized in polymer chain, and copolymerization property of olefin may be easily controlled, thus more easily realizing the aimed properties.

As the carrier, carriers containing hydroxy groups or siloxane groups on the surface may be used. Specifically, carriers dried at high temperature to remove moisture on the surface, thus containing highly reactive hydroxy groups or siloxane groups may be used. More specifically, as the carrier, silica, alumina, magnesia or a mixture thereof may be used. The carried may be dried at high temperature, and may commonly comprise oxide, carbonate, sulfate, nitrate of $Na_2O$, $K_2CO_3$, $BaSO_4$ and $Mg(NO_3)_2$, and the like.

The hybrid supported catalyst may further comprise a cocatalyst so as to activate the first and second transition metal compounds. As the cocatalyst, those commonly used in the art may be used without specific limitations. As non-limiting examples, the cocatalyst may be one or more compounds selected from the group consisting of compounds represented by the following Chemical Formulas 3 to 5.

$R_{10}—[Al(R_9)—O]_n—R_{11}$ [Chemical Formula 3]

in the Chemical Formula 3, $R_9$, $R_{10}$, and $R_{11}$ are each independently, one of hydrogen, halogen, a C1 to 20 hydrocarbyl group, and a C1 to 20 hydrocarbyl group substituted with halogen, n is an integer of 2 or more, $D(R_{12})_3$ [Chemical Formula 4]

in the Chemical Formula 4,

D is aluminum or boron, $R_{12}$'s are each independently, one of halogen, a C1 to 20 hydrocarbyl group, a C1 to 20 hydrocarbyloxy, and a C1 to 20 hydrocarbyl group substituted with halogen, $[L-H]^+[W(A)_4]^-$ or $[L]^+[W(A)_4]^-$ [Chemical Formula 5]

in the Chemical Formula 5,

L is neutral or cationic Lewis base, H is hydrogen atom,

W is Group 13 element, As are each independently, one of a C1 to 20 hydrocarbyl group; a C1 to 20 hydrocarbyloxy group; and these substituents in which one or more hydrogen atoms are substituted with one or more substituents selected from halogen, a C1 to 20 hydrocarbyloxy group and a C1 to 20 hydrocarbyl(oxy)silyl group.

As non-limiting examples of the compounds represented by the Chemical Formula 3, methylaluminoxane, ethylaluminoxane, iso-butylaluminoxane or tert-butylaluminoxane, and the like may be mentioned. And, as non-limiting examples of the compounds represented by the Chemical Formula 4, trimethylaluminum, triethylaluminum, triisobutylaluminum, tripropylaluminum, tributylaluminum, dimethylchloroaluminum, triisopropylaluminum, tri-sec-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide or dimethylaluminum ethoxide, and the like may be mentioned. Finally, as non-limiting examples of the compounds represented by the Chemical Formula 5, trimethylammonium tetrakis(pentafluorophenyl)borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, tetrakis(4-(triisopropylsilyl)-2,3,5,6-tetrafluorophenyl)borate, N,N-dimethylanilinium pentafluorophenoxytris(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, N,N-dimethylanilinium tetrakis(2,3,4,6-tetrafluorophenyl)borate, hexadecyldimethylammonium tetrakis(pentafluorophenyl)borate, N-methyl-N-dodecylanilinium tetrakis(pentafluorophenyl)borate or methyl di(dodecyl)ammonium tetrakis(pentafluorophenyl)borate, and the like may be mentioned.

Such a hybrid supported catalyst may be prepared by, for example, supporting a cocatalyst on a carrier, and supporting a catalyst precursor, namely, the first and second transition metal compounds on the cocatalyst-supported carrier.

Specifically, in the step of supporting a cocatalyst on a carrier, a carrier dried at high temperature and a cocatalyst may be mixed, and stirred at a temperature of about 20 to about 120° C., thus preparing a cocatalyst-supported carrier.

And, in the step of supporting a catalyst precursor on the cocatalyst-supported carrier, the first transition metal compound may be added to the cocatalyst-supported carrier, and stirred at a temperature of about 20 to about 120° C., and then, the second transition metal compound may be added, and stirred at a temperature of about 20 to about 120° C., thus preparing a hybrid supported catalyst.

In the step of supporting a catalyst precursor on the cocatalyst-supported carrier, the catalyst precursor may be added to the cocatalyst-supported carrier and stirred, and then, a cocatalyst may be additionally added to prepare a hybrid supported catalyst.

The contents of the carrier, cocatalyst, cocatalyst-supported carrier, first and second transition metal compounds used may be appropriately controlled according to the aimed properties or effects of the hybrid supported catalyst When preparing the hybrid supported catalyst, as the solvent, hydrocarbon solvents such as pentane, hexane, heptane, and the like, or aromatic solvents such as benzene, toluene, and the like may be used.

For specific preparation method of the hybrid supported catalyst, examples described below may be referred to. However, the preparation method of the hybrid supported catalyst is not limited to the contents described herein, but any steps commonly used in the art may be additionally used, and the step(s) of the preparation method may be modified by commonly modifiable step(s).

The polyolefin according to one embodiment of the invention may be provided by a method for preparing polyolefin comprising a step of polymerizing olefin monomers in the presence of the hybrid supported catalyst.

As examples of olefin monomers that can be polymerized with the hybrid supported catalyst, ethylene, alpha-olefin, cyclic olefin, and the like may be mentioned, and diene olefinic monomers or triene olefinic monomers having two or more double bonds can also be polymerized. As specific examples of the monomers, ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene, 3-chloromethyl styrene, and the like may be mentioned, and two or more of these monomers may be mixed and copolymerized. In case the polyolefin is copolymer of ethylene and other comonomers, it is preferable that the comonomer is one or more selected from the group consisting of propylene, 1-butene, 1-hexene, 4-methyl-1-pentene and 1-octene.

For the polymerization of the olefin monomers, various polymerization processes known as the polymerization reaction of olefin monomers, such as a continuous solution polymerization process, a bulk polymerization process, a suspension polymerization process, a slurry polymerization process or an emulsion polymerization process, and the like may be used.

Specifically, the polymerization reaction may be conducted at a temperature of about 50 to about 110° C. or about 60 to about 100° C. under pressure of about 1 to about 100 $kgf/cm^2$ or about 1 to about 50 $kgf/cm^2$.

And, in the polymerization reaction, the hybrid supported catalyst may be used while being dissolved or diluted in a solvent such as pentane, hexane, heptane, nonana, decane, toluene, benzene, dichloromethane, chlorobenzene, and the like. Wherein, a small amount of water or air that may have a bad influence on the catalyst may be previously removed by treating the solvent with a small amount of alkylaluminum, and the like.

The polyethylene obtained according to the preparation method of one embodiment has low melt flow rate, narrow molecular weight distribution, and a high content of high molecular weight components, and thus, may exhibit excellent ESCR and tensile strength, and may be very preferably used for the preparation of beverage container or bottle cap.

Hereinafter, the invention will be explained in detail through the examples of the invention. However, these examples may be modified to various forms, and it should not be understood that the scope of the invention is limited to the examples described below.

EXAMPLE

Synthesis Examples of Transition Metal Compound

Synthesis Example 1

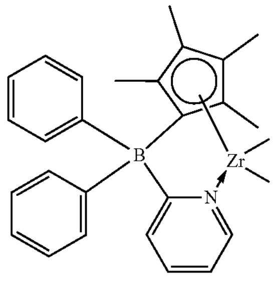

2-Bromopyridine (1 eq.) was dissolved in tetrahydrofuran (0.1 M), and n-butyllithium (1 eq.) was slowly added dropwise at −90° C., and then, the mixture was stirred at the same temperature for 1 hour. And then, chlorodiphenylborane (1 eq.) was dissolved in toluene (0.3 M), and then, slowly added dropwise to the first reaction mixture at −78° C., and the mixture was stirred for 1 hour. And then, it was stirred at room temperature for 12 hours, the solvent was vacuum dried, toluene was introduced, solids were removed by filtering, and the residual solution was vacuum dried to obtain diphenyl(pyridin-2-yl)borane.

The obtained diphenyl(pyridin-2-yl)borane (1 eq.) was dissolved in tetrahydrofuran (0.1 M), and a solution of lithium tetramethyl cyclopentadienide ($Li(CpMe_4)$, 1 eq.) in tetrahydrofuran (0.1 M) was slowly added dropwise at 0° C., and then, the mixture was stirred at room temperature overnight. The solvents were vacuum dried, toluene/diethyl ether (volume ratio 3/1, 0.3 M) were added to dissolve, $MCl_4$ (1 eq.) was mixed with toluene (0.2 M) and added at −78° C., and the mixture was stirred at room temperature overnight. After the reaction was completed, the solvents were vacuum dried, dichloromethane was introduced, salts were removed by filtering, the filtrate was vacuum dried, and then, dichloromethane/hexane was added to recrystallize. The produced solid was filtered and vacuum dried to obtain dichloro{diphenyl(pyridin-2-yl-κN)($\eta^5$-2,3,4,5-tetramethylcyclopenta-2,4-dien-1-ylidene)borate}zirconium (IV).

Dichloro{diphenyl(pyridin-2-yl-κN)($\eta^5$-2,3,4,5-tetramethylcyclopenta-2,4-dien-1-ylidene)borate}zirconium (IV)(1 eq.) was dissolved in toluene/diethyl ether (volume ratio 3/1, 0.3 M), and then, a solution of methyl lithium (2 eq.) in hexane or diethyl ether was slowly added dropwise at −78° C., and the mixture was stirred at room temperature for 12 hours. After the reaction was completed, the solvents were vacuum dried, dichloromethane was added, salts were removed by filtering, the filtrate was vacuum dried, and then, dichloromethane/hexane was added to recrystallize. The produced solid was filtered and vacuum dried to obtain a precursor compound.

1H NMR (500 MHz, $CDCl_3$, ppm)=δ 8.32 (d, 1H), 8.05 (d, 4H), 7.70 (t, 1H), 7.42 (t, 1H), 7.40 (t, 4H), 7.23 (d, 1H), 7.17 (t, 2H), 2.08 (s, 6H), 1.93 (s, 6H) 0.95 (s, 6H)

Synthesis Example 2

Preparation of $[tBu\text{-}O—(CH_2)_6—C_5H_4]_2ZrCl_2$ t-Butyl-O—$(CH_2)_6$—Cl was prepared using 6-chlorohexanol by a method suggested in a document (Tetrahedron Lett. 2951 (1988)), and NaCp was reacted therewith to obtain t-Butyl-O—$(CH_2)_6$—$C_5H_5$ (yield 60%, b.p. 80° C./0.1 mmHg).

And, the t-Butyl-O—$(CH_2)_6$—$C_5H_5$ was dissolved in THF at −78° C., n-BuLi was slowly added dropwise, and then, the temperature of the mixture was raised to a room temperature, and the mixture was reacted for 8 hours. The synthesized lithium salt solution was slowly added to a suspension of $ZrCl_4(THF)_2$ (1.70 g, 4.50 mmol)/THF (30 ml) at −78° C., and further reacted at room temperature for 6 hours.

All the volatiles were vacuum dried, and a hexane solvent was added to the obtained oily liquid to filter. The filtered solution was vacuum dried, and then, hexane was added to induce precipitation at low temperature (−20° C.). The obtained precipitate was filtered at room temperature to obtain a $[tBu\text{-}O—(CH_2)_6—C_5H_4]_2ZrCl_2$ compound in the form white solid (yield 92%).

$^1H$ NMR (300 MHz, $CDCl_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}C$ NMR ($CDCl_3$): 135.09, 116.66, 112.28, 72.42, 61.52, 30.66, 30.61, 30.14, 29.18, 27.58, 26.00.

Preparation Example of Supported Catalyst

Preparation Example 1

4.0 kg of toluene was put in an autoclave, 1 kg of silica was introduced, and then, the mixture was stirred while raising the temperature to 95° C. The silica was sufficiently dispersed, and then, 5.7 kg of a solution of 10 wt % methylaluminoxane (MAO)/toluene was introduced, and stirred at 95° C. at 200 rpm for 16 hours. The temperature was decreased to 40° C., and then, the reaction mixture was washed with a sufficient amount of toluene to remove unreacted aluminum compounds.

And then, the temperature of the reactor was raised to 80° C., 100 mL of a toluene solution in which the transition metal compound of Synthesis Example 1 is dissolved at the molar concentration of 0.05 M was introduced in the reactor, and then, stirred for 2 hours. And then, 100 mL of a toluene solution in which the transition metal compound of Synthesis Example 2 is dissolved at the molar concentration of 0.1 M was introduced in the reactor, and then, stirred for 2 hours.

And then, the catalyst was settled, the temperature of the reactor was decreased to a room temperature, and the toluene layer was separated and removed, and then, replaced with hexane. And then, the catalyst was settled, the hexane layer was separated and removed, and remaining hexane was removed by decompression to prepare a hybrid supported catalyst.

Preparation Example 2

A hybrid supported catalyst was prepared by the same method as Preparation Example 1, except that 100 mL of a toluene solution in which the transition metal compound of Synthesis Example 2 was dissolved at the molar concentration of 0.15 M, was used in Preparation Example 1.

Comparative Preparation Example 1

A single supported catalyst was prepared using only a toluene solution (100 mL) in which the transition metal compound of Synthesis Example 1 is dissolved at the molar concentration of 0.05 M, in Preparation Example 1.

Preparation Example of polyethylene

Example 1

Into a 220 L reactor of pilot plant, the hybrid supported catalyst prepared in Preparation Example 1 was introduced in a single slurry polymerization process and high density polyethylene was prepared according to a standard method. 10 kg/hr of ethylene and 3.0 g/hr of hydrogen were continuously reacted at the reactor temperature of 80° C. in the form of hexane slurry. Thereto, 5 mL/min of 1-butene was introduced as comonomers. After the reaction, solvent removal and drying gave high density polyethylene in the form of powder.

Example 2

High density polyethylene in the form of powder was prepared by the same method as Example 1, except that the supported catalyst prepared in Preparation Example 2 was used instead of the supported catalyst prepared in Preparation Example 1.

Example 3

High density polyethylene in the form of powder was prepared by the same method as Example 1, except that 1.8 g/hr of hydrogen was introduced.

Example 4

High density polyethylene in the form of powder was prepared by the same method as Example 1, except that 5.0 g/hr of hydrogen was introduced.

Comparative Example 1

High density polyethylene in the form of powder was prepared by the same method as Example 1, except that the supported catalyst prepared in Comparative Preparation Example 1 was used instead of the supported catalyst prepared in Preparation Example 1, and that the amount of hydrogen introduced was reduced to 0.5 g/hr.

Comparative Example 2

CAP508 (INEOS company) prepared using a Ziegler-Natta catalyst was used as the polyethylene of Comparative Example 2.

Comparative Example 3

C410 (Hanwha total) prepared using a metallocene catalyst was used as the polyethylene of Comparative Example 3.

Comparative Example 4

Example 1 of KR patent registration No. 2090811 was used as the polyethylene of Comparative Example 4.

Comparative Example 5

Example 2 of KR patent registration No. 2090811 was used as the polyethylene of Comparative Example 5.

Experimental Example

For each polyethylene prepared in Examples and Comparative Examples, the properties were measured as follows, and the results were shown in the following Table 1.

1) Density ($g/cm^3$)

The density of polyethylene was measured at 23° C.° according to ISO 1183-2.

2) Melt Flow Rate (MFR, g/10 Min)

Melt flow rate was measured at 190° C., under load of 2.16 kg according to ASTM D1238, and indicated as the weight (g) of polyethylene that was molten and came out for 10 minutes.

3) Melt Flow Rate Ratio (MFRR, $MFR_5/MFR_{2.16}$)

Melt flow rate ratio was indicated as a value obtained by dividing melt flow rate ($MFR_5$) measured at 190° C. under load of 5 kg according to ASTM D1238 by melt flow rate ($MFR_{2.16}$) measured at 190° C. under load of 2.16 kg.

4) Molecular Weight (Mn, Mw, g/Mol) and Molecular Weight Distribution (MWD, Mw/Mn)

The weight average molecular weight (Mw) and number average molecular weight (Mn) of polyethylene were measured using gel permeation chromatography (GPC, manufactured by Agilent), and the weight average molecular weight was divided by the number average molecular weight to calculate molecular weight distribution (MWD).

Specifically, as the gel permeation chromatography (GPC) Agilent PL-GPC220 device was used, and Polymer Laboratories PLgel MIX-B 300 mm length column was used. Wherein, the measurement temperature was 160° C., 1,2,4-trichlorobenzene was used as a solvent, and flow rate was 1 mL/min. Each polyethylene sample obtained in Examples and Comparative Examples was pre-treated by dissolving in 1,2,4-trichlorobenzene containing BHT 0.0125% at 160° C., for 10 hours, and prepared at the concentration of 10 mg/10 mL, and then, fed in an amount of 200 μL. Using a calibration curve formed using polystyrene standard specimen, Mw and Mn values were induced. As polystyrene standard specimen, 9 kinds with weight average molecular weights of 2000 g/mol, 10000 g/mol, 30000 g/mol, 70000 g/mol, 200000 g/mol, 700000 g/mol, 2000000 g/mol, 4000000 g/mol, 10000000 g/ml were used.

Figure 2:
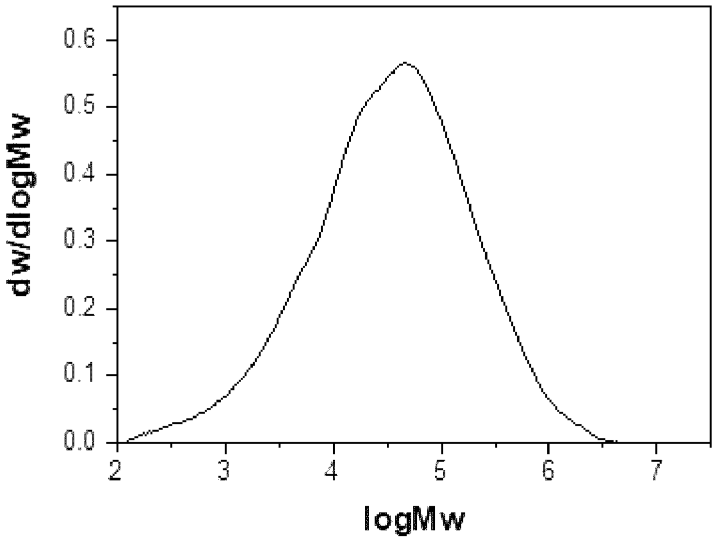
FIG. 2 is a GPC graph of polyethylene according to Comparative Example 1.

The GPC graph of polyethylene according to Example 1 of the invention was shown in FIG. 1, and the GPC graph of polyethylene according to Comparative Example 1 was shown in FIG. 2.

5) Log Mw (6.0):

Through the GPC curve graph measured in 4), a rate of an integral value of the area in which Log Mw is 6.0 or more to the total area (integral value) of the entire GPC curve graph was calculated.

6) Log Mw (53.0):

Through the GPC curve graph measured in 4), a rate of an integral value of the area in which Log Mw is 3.0 or less to the total area (integral value) of the entire GPC curve graph was calculated.

6) ESCR (Environmental Stress Crack Resistance)

According to ASTM D 169, using 10% Igepal CO-630 solution, at a temperature of 50° C., a time until F50 (50% destruction) was measured.

7) Tensile Strength

Tensile strength was measured at a speed of 50 mm/min according to ASTM D638.

8) Cap Crack Resistance

Using an injection molding machine of 120 ton screw 300 standard (manufactured by Angel company), under conditions of injection temperature of 240° C., injection speed of 80 mm/s, and holding pressure of 700 bar, cap (20 mm cap according to PET standard PCO 1881) was manufactured. While the molded cap was dipped in a Igepal 5% solution bath heated to 42° C., air of 5 bar pressure was applied inside the cap, and a time when the atmospheric pressure began to reduce was measured.

9) Cap Diameter Deviation 100 or more caps were manufactured under the same injection conditions as 8), and then, among the injection molded caps, 20 caps were randomly selected and the diameters were measured by sizer (QVI SPRINTMVP 200, Quality Vision International Inc.), and coefficient of variation of the measured diameters was calculated.

TABLE 1

| | Example1 | Example2 | Example3 | Example4 | Comparative Example1 | Comparative Example2 | Comparative Example3 | Comparative Example4 | Comparative Example5 |
|---|---|---|---|---|---|---|---|---|---|
| Density ($g/cm^3$) | 0.952 | 0.951 | 0.952 | 0.950 | 0.952 | 0.952 | 0.953 | 0.952 | 0.952 |
| MFR (2.16 kg, g/10 min) | 0.60 | 0.52 | 0.40 | 1.02 | 2.18 | 1.75 | 1.21 | 0.22 | 0.45 |
| MFRR ($MFR_5/MFR_{2.16}$) | 3.7 | 3.3 | 4.2 | 3.6 | 3.9 | 3.4 | 4.2 | 6.7 | 7.2 |
| molecular weight distribution (Mw/Mn) | 12.0 | 7.2 | 13.5 | 9.8 | 14.7 | 17.2 | 24.5 | 10.6 | 12.3 |
| Log Mw (≥6.0) (%) | 2.3 | 2.1 | 3.2 | 1.4 | 2.5 | 1.3 | 1.7 | 7.4 | 8.1 |
| Log Mw (≤3.0) (%) | 0.9 | 0.7 | 0.6 | 1.2 | 1.4 | 2.2 | 1.6 | 0.8 | 1.0 |
| ESCR (hours) | 300 | 250 | 350 | 200 | 200 | 120 | 150 | 350 | 220 |
| Tensile strength (MPa) | 37 | 35 | 42 | 35 | 18 | 25 | 24 | 39 | 34 |
| Cap Crack Resistance (hours) | 300 | 250 | 160 | 220 | 65 | 40 | 55 | 110 | 100 |
| Coefficient of variation of cap diameter (%) | <0.1% | <0.1% | 0.3% | 0.4% | 0.3% | 0.7% | 0.5% | 3.4% | 4.2% |

Referring to Table 1, Examples 1 to 4 satisfying all the properties have ESCR of 250 hours or more, cap crack resistance of 120 hours or more, and tensile strength of 35 MPa or more, and thus, are expected to exhibit excellent properties suitable for the preparation of food containers such as bottle caps.

And, when caps were injection molded, size deviation (coefficient of variation) was very small (within 0.4%), and thus, it appears that processability is satisfactory and defect rate is low, and it can be expected that binding property to a container is excellent.

What is claimed is:

1. A polyethylene polymer satisfying the following requirements of i) to v):

i) density measured at 23° C. according to ISO 1183-2 being 0.945 to 0.960 g/cm$^3$;

ii) a melt flow rate (MFR) measured at 190° C. under load of 2.16 kg according to ASTM D1238 being 0.4 to 2.0 g/10 min;

iii) a melt flow rate ratio (MFRR) of $MFR_5/MFR_{2.16}$ being 3.0 to 5.0, wherein $MFR_5$ is a melt flow rate measured at 190° C. under load of 5 kg according to ASTM D1238, and $MFR_{2.16}$ is a melt flow rate measured at 190° C. under load of 2.16 kg according to ASTM D1238;

iv) a molecular weight distribution (MWD) of Mw/Mn being 7.0 to 15.0, wherein Mw is a weight average molecular weight, and Mn is a number average molecular weight; and v) an integral value of an area where Log Mw value is 6.0 or more in a gel permeation chromatography (GPC) curve graph being 2.0 to 7.0% of an entire integral value, wherein environmental stress crack resistance (ESCR) measured according to ASTM D 1693 is 200 hours or more.

2. The polyethylene polymer according to claim 1, wherein the polyethylene is a copolymer of ethylene and one or more comonomers selected from the group consisting of propylene, 1-butene, 1-hexene, 4-methyl-1-pentene and 1-octene.

3. The polyethylene polymer according to claim 1, wherein the integral value of the area where Log Mw value is 3.0 or less in a GPC curve graph is 2.5% or less of the entire integral value.

4. The polyethylene polymer according to claim 1, wherein the molecular weight distribution (MWD) of Mw/Mn is 10.0 to 15.0.

5. The polyethylene polymer according to claim 1, wherein tensile strength measured according to ASTM D638 is 35 MPa or more.

6. A method for preparing the polyethylene polymer of claim 1, comprising polymerizing olefinic monomers in the presence of a hybrid supported catalyst comprising a first transition metal compound represented by Chemical Formula 1, a second transition metal compound represented by Chemical Formula 2, and a carrier on which the first and second transition metal compounds are supported:

[Chemical Formula 1]

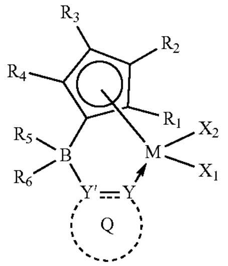

wherein, in Chemical Formula 1,

B is boron,

M is a Group 4 transition metal, $R_1$ to $R_4$ are each independently, hydrogen, $C_{1-20}$ alkyl, $C_{3-20}$ cycloalkyl, or $C_{6-20}$ aryl, or optionally $R_1$ and $R_2$ or $R_3$ and $R_4$ are bonded with each other to form a substituted or unsubstituted $C_{6-60}$ aromatic ring, $R_5$ and $R_6$ are each independently, $C_{1-20}$ alkyl, $C_{3-20}$ cycloalkyl, or $C_{6-20}$ aryl, or optionally $R_5$ and $R_6$ are bonded with each other to form a $C_{3-60}$ aliphatic ring, or a $C_{6-60}$ aromatic ring, $X_1$ and $X_2$ are each independently, $C_{1-20}$ alkyl or —O(CO)R', wherein R' is $C_{1-20}$ alkyl, Q is a substituted or unsubstituted $C_{2-60}$ heterocycle comprising one or more selected from the group consisting of N, O and S, Y and Y' are elements constituting Q, Y is N, O, or S, Y' is N or C, $$[Cp_1(R_7)_a][Cp_2(R_8)_b]M'X_3X_4 \quad \text{[Chemical Formula 2]}$$

wherein, in Chemical Formula 2, $Cp_1$ and $Cp_2$ are identical to or different from each other, and are each independently one of cyclopentadienyl, indenyl, 4,5,6,7-tetrahydro-1-indenyl or fluorenyl groups, M' is a Group 4 transition metal, $X_3$ and $X_4$ are each independently, halogen, $C_{1-20}$ alkyl, $C_{2-10}$ alkenyl, $C_{6-20}$ aryl, $C_{7-20}$ alkylaryl, or $C_{7-20}$ arylalkyl, $R_7$ and $R_8$ are identical to or different from each other, and are each independently, one of hydrogen, a $C_1$ to C30 hydrocarbyl group, a C1 to C30 hydrocarbyloxy group, a C2 to C30 hydrocarbyloxyhydrocarbyl group, —$SiH_3$, a C1 to C30 hydrocarbyl(oxy)silyl group, and a C1 to C30 hydrocarbyl group substituted with halogen, and a and b are each independently, an integer of 0 to 5.

7. The method according to claim 6, wherein a mole ratio of the first transition metal compound to the second transition metal compound is 1:1 to 1:10.

8. The method according to claim 6, wherein the hybrid supported catalyst further comprises one or more cocatalysts selected from the group consisting of compounds represented by Chemical Formulas 3 to 5:

$$R_{10}—[Al(R_9)—O]_n—R_{11} \quad \text{[Chemical Formula 3]}$$

wherein, in Chemical Formula 3, $R_9$, $R_{10}$, and $R_{11}$ are each independently, one of hydrogen, halogen, a C1 to C20 hydrocarbyl group, or a C1 to C20 hydrocarbyl group substituted with halogen, and n is an integer of 2 or more, $$D(R_{12})_3 \quad \text{[Chemical Formula 4]}$$

wherein, in the Chemical Formula 4,

D is aluminum or boron, plural $R_{12}$s are each independently, one of halogen, a C1 to C20 hydrocarbyl group, a C1 to C20 hydrocarbyloxy group, or a C1 to C20 hydrocarbyl group substituted with halogen, $[L\text{-}H]^+[W(A)_4]^-$ or $[L]^+[W(A)_4]^-$ [Chemical Formula 5]

wherein, in the Chemical Formula 5,

L is a neutral or cationic Lewis base, H is a hydrogen atom,

W is a Group 13 element, and plural As are each independently, one of a C1 to C20 hydrocarbyl group; a C1 to C20 hydrocarbyloxy group; or substituents of which one or more hydrogen atoms are substituted with one or more substituents selected from halogen, a C1 to C20 hydrocarbyloxy group and a C1 to C20 hydrocarbyl(oxy)silyl group.

* * * * *